Patented Sept. 14, 1926.

1,600,159

UNITED STATES PATENT OFFICE.

JOE OLGIERD ZDANOWICH, OF LONDON, ENGLAND.

MAKING CELLULOSE ACETATE DIRECTLY SPINNABLE FROM REACTION MIXTURES IN COMMERCIAL FORM.

No Drawing. Application filed August 24, 1925, Serial No. 52,234, and in Great Britain August 15, 1924.

This invention relates to the production of a reaction mixture resulting from the acetylation of cellulose, especially such as can be converted directly into films, filaments and the like without first precipitating the acetate and then dissolving it by a process involving in the first stage of the acetylation the chlorination of a mixture of cellulose and an acetylating agent.

I find that in the preparation of such acetylated solutions or mixtures after the chlorination some of the free chlorine remains in the reaction mixture.

The object of the present invention is to provide a process which enables this to be utilized.

To that end I have made a number of experiments and I have found that by using this chlorine to form a condensing agent in the nascent state I can altogether dispense with the strong condensing agent usually required to form an acetate of the character indicated above, which is an acetate of high acetyl content, or at least reduce it to a very small quantity, for example of the order of 0.01 to 0.1 per cent of the cellulose employed or even still less.

The invention in brief consists in a method for the production of a reaction mixture resulting from the acetylation of cellulose, especially such as can be converted directly into films, filaments and the like, without first precipitating the acetate and then dissolving it by a process involving in the first stage of the acetylation the chlorination of a mixture of cellulose and an acetylating agent, leaving free chlorine in the solution which comprises the utilization of this chlorine to form in the second stage of the acetylation a nascent condensing agent, for example by the passage of sulphur dioxide into the reaction mixture.

The invention includes a method as described in the preceding paragraph followed by the addition of a very small quantity of a strong condensing agent, namely an amount of the order of 0.01 to 0.1 per cent of the weight of the cellulose employed.

In carrying this invention into effect in one form by way of example I take a quantity of cellulose and introduce it into a mixture of about three times its weight of acetic anhydride with a quantity of glacial acetic acid about 9 times its weight. The mixture is raised to a temperature preferably of from 40° C. to 50° C. and chlorine gas is introduced while the mixture is stirred. The vessel containing the mixture is preferably closed and the chlorine is bubbled through slowly, the rate conveniently for a quantity of about a few kilograms of cellulose being such that when measured by bubbling through sulphuric acid at atmospheric pressure 100 to 120 bubbles per minute are delivered. The action is substantially complete when partial or complete disintegration or conversion of the cellulose is observed or when the cellulose derivative on analysis is found to contain about 20 to 30 per cent of acetyl radicle expressed in acetic acid, free chlorine remaining in the solution. The process to this point I describe as the first stage.

As the second stage I then pass in sulphur dioxide to an amount equal to 5 per cent by weight of the cellulose and after a period of time when the whole mixture changes substantially into a colourless solution as the third stage I add a very small amount of sulphuric acid, namely about 0.01 per cent of the cellulose.

When the acetylation is thus completed I stabilize the mixture by adding thereto a small quantity of water, for example equal to about 50 per cent by weight of the cellulose, the addition being made gradually to avoid local high concentration, the mixture being well stirred also in order to effect complete homogeneity. The stabilized mixture I subsequently convert into filaments, the resulting solution after being submitted to the extraction of air bubbles and filtered is capable of being squirted through fine orifices or capillary tubes into a coagulating bath for the industrial manufacture of artificial silk, horsehair and the like. If desired it may be formed into films by spreading a layer on a suitable endless belt, the greater part of which is submerged in a coagulating bath.

If the acetylation is complete at the end of the second stage there is no need to add the sulphuric acid referred to above forming the third stage of the example given. Apparently the sulphur dioxide reacts with the chlorine to produce sulphuryl chloride which is known to be a condensing agent in the manufacture of cellulose acetates, but as according to the present process this is available in the nascent state apparently it enables acetylation to be obtained without the addition of a strong condensing agent or by the use of only a very small quantity thereof. In place of sulphuric acid other strong condensing agents may be used. In place of sulphur dioxide other bodies reacting with chlorine to form nascent condensing agents may be employed; for example, sulphur trioxide or an oxide of phosphorus. The amount of the substance added to react with the chlorine may vary within wide limits, depending on the amount of chlorine available, and may be, for example, 5 to 20 per cent. by weight of the cellulose.

Should the temperature be raised or the amount of accelerant increased acetylation may be thus completed but from the manufacturing point of view I do not consider this convenient nor economical, for which reason I prefer to add as described a very small amount of a strong condensing agent, for instance sulphuric acid 0.01 per cent, or even less. Greater amounts, for instance up to 0.8 per cent, may be used but in my opinion no particular advantage is derived therefrom.

Having now described my invention, what I claim as new and desire to secure by Letters Patent is:—

1. A method for the production of a reaction mixture resulting from the acetylation of cellulose which consists in the chlorination of a mixture of cellulose and an acetylating agent in the presence of cellulose and the treatment of this chlorinated mixture with a substance which forms a nascent condensing agent with the chlorine.

2. A method for the production of a reaction mixture resulting from the acetylation of cellulose such as can be converted directly into films, filaments and the like without first precipitating the acetate and then dissolving it, which comprises a process involving in the first stage of the acetylation the chlorination of a mixture of cellulose and an acetylating agent, leaving free chlorine in the solution and the utilization of this chlorine to form in the second stage of the acetylation a nascent condensing agent.

3. A process as claimed in claim 1 followed by the addition of a very small quantity of a strong condensing agent, namely an amount of the order of 0.01 to 0.1 per cent. of the weight of the cellulose employed.

4. A method for the production of a reaction mixture resulting from the acetylation of cellulose which comprises acetylation of cellulose by acetic anhydride in the presence of chlorine followed by the introduction into the chlorinated reaction mixture of sulphur dioxide.

5. A process as claimed in claim 4, including the addition of a small quantity of water for the purpose of stabilizing the solution when acetylation is complete.

In testimony whereof I have signed my name to this specification.

JOE OLGIERD ZDANOWICH.